May 16, 1933.  H. CASLER  1,909,658

LATHE CHUCK

Filed Nov. 9, 1931

INVENTOR
Herman Casler

WITNESS
H. L. Meade

BY
Denison & Thompson
ATTORNEYS

Patented May 16, 1933

1,909,658

UNITED STATES PATENT OFFICE

HERMAN CASLER, OF CANASTOTA, NEW YORK

LATHE CHUCK

Application filed November 9, 1931. Serial No. 573,755.

This invention relates to a power operated lathe chuck of the scroll and jaw type in which the jaws (three or four) and scroll may be of conventional design.

The main object is to provide a simple, compact, and efficient means adapted to be brought into action by the voluntary operation of a single control member for causing the jaws to grip or release the work without interrupting the rotation of the chuck.

One of the specific objects is to effect the operation of the scroll relatively to the chuck body for closing and opening the jaws from and upon the work through a medium of differential speed gearing between the chuck body and scroll.

Another specific object is to provide means whereby the movable clutch member will be automatically disconnected from its shifting means and restored to its neutral or inoperative position when the movement of the jaws in either direction is opposed, as for example, when gripping the work.

Other objects and uses relating to specific parts of the device will be brought out in the following description.

In the drawing:—

Figure 1 is a longitudinal vertical sectional view, partly in elevation, of a portion of a lathe chuck showing the various parts of my invention in which the scroll operating means and controlling means therefor are in their neutral or inoperative positions.

Figure 2 is a transverse vertical sectional view taken in the plane of line A—A, Figure 1.

Figure 3 is a detail vertical sectional view taken in the plane of line B—B, Figure 1.

Figures 4 and 5 are similar sectional views taken in the plane of line C—C, Figure 1, except that the controlling rack is in its normal position in Figure 4 and in one of its shifted positions in Figure 5.

As illustrated, this chuck comprises a relatively stationary frame or bearing member —1— in which is journaled a lathe spindle —2— to which is secured a chuck body —23— to rotate therewith, said chuck body being provided with three or more sets of radial guides —23'— for receiving and supporting a corresponding number of radially movable jaws —27—, as shown more clearly in Figure 1.

The frame or bearing member —1— is provided with a radial extension —1'— having its outer end formed with an axially extending projection —1"— overhanging the periphery of the chuck body —23—.

A pivotal pin or spindle —3— is mounted in the outer portion of the extensions —1'— and —1"— parallel with the lathe spindle —2— for receiving and supporting a gear case or housing —4— and an axially movable radial arm —16— so that said gear case and arm may be free to swing laterally about the axis of the pivotal pin —3— for a purpose presently described.

A relatively short shaft —5— is rotatively mounted in suitable bearings in the gear case —4— and arm —16— between and parallel with the lathe spindle —2— and pivotal pin —3— and is also movable axially with the arm —16— relatively to the gear case in a manner and for a purpose hereinafter described.

The chuck body —23— is provided with peripheral gear teeth —22— meshing with a relatively small gear —6— on the shaft —5— which is provided with spline members —14— engaging in internal radial grooves in the gear —6— to cause the latter to rotate in unison with the chuck body —23— and thereby to rotate the shaft —5— at the same speed as the gear —6—.

Additional gears —7— and —8— are loosely mounted upon the shaft —5— coaxial with the gear —6— and are adapted to mesh respectively with gear teeth —24— and —25— upon the periphery of the scroll supporting member —26— which latter is mounted upon the chuck body —23— to rotate therewith, but is adapted to have an independent rotary motion about the axis of the lathe spindle —2— for opening and closing the jaws.

The pitch diameter of the gear teeth —24— on the scroll member —26— is somewhat less than that of the gear —22— on the chuck body —23— while the pitch diameter of the gear teeth —25— of the scroll member —26— is somewhat greater than that of the gear teeth —22— of the chuck body —23—.

It, therefore, follows that the pitch diameter of the gear —7— is somewhat greater than that of the gear —6— while the pitch diameter of the gear —8— is somewhat less than that of the gears —6— and —7—.

Under these conditions, it is evident that the gear —6— and its shaft —5— will be normally rotated at a constant speed proportionate to that of the chuck body —23— and spindle —2— under which conditions the scroll member —26— will be normally rotated at the same speed as the chuck body, while the gears —7— and —8— may rotate freely upon the shaft —5— at speeds different from that of the gear —6— and shaft —5—, it being understood that the gears —7— and —8— are loose upon the shaft —5— to permit this relative differential speed rotation.

The central portions of the gears —7— and —8— bearing upon the shaft —5— are arranged in axially spaced relation for receiving radial cam studs —15— which are secured to the shaft —5— in uniformly spaced circumferential relation to rotate freely between the inner faces of the central portions of the gears —7— and —8— without transmitting motion thereto as shown more clearly in Figure 1.

The adjacent ends of the central portions of the gears —7— and —8— are provided with recesses —32— and —32'— with which the cam studs —15— are adapted to alternately engage when the shaft —5— is moved axially in opposite directions for transmitting rotary motion from said shaft to the gears —7— or —8— with which the cam studs —15— may be engaged.

That is, if the shaft —5— is moved axially toward the left hand of Figure 1, the cam studs —15— will be brought into engagement with the recesses —32— thereby locking the gear —8— to the shaft —5— to rotate therewith.

Again, if the shaft —5— is moved toward the right hand end of Figure 1, the cam studs —15— will be brought into engagement with the recesses —32'— for locking the gear —7— to said shaft to rotate therewith.

The means for effecting this axial movement of the shaft —5— comprises a rock shaft —21— journaled in suitable bearings in the frame or bearing member —1— at right angles to the axis of the shaft —5— and provided with gear teeth —21'— meshing with a tooth rack bar —20— which is slidable in a guideway —20'— in the frame or bearing member —1— lengthwise of and in a plane below the shaft —5— as shown in Figure 1, said rock shaft —21— being provided with a handle —21''— shown by dotted lines in Figure 1 for rocking the same about its axis.

As previously stated, the arm —16— is slidable along and upon the pivotal pin —3— and has its lower end embracing a reduced portion of the shaft —5— and held against axial movement relatively to said shaft by means of the nut —17— and washer —18— so that any sliding movement of the arm —16— along the pivotal pin —3— will be transmitted to the shaft —5—.

The lower end of the arm —16— is provided with a pendant lug —19— which is normally interposed between axially spaced shoulders —31— and —34— on the inner end of the rack bar —20— as shown more clearly in Figures 1, 3, and 4 whereby the axial movement of the rack bar by the rotation of the pinion —21'— will cause a corresponding axial movement of the arm —16— and shaft —5— connected thereto.

This axial movement of the shaft —5— in one direction or the other from its normal or neutral position will bring the clutch members —15— into engagement with the recesses —32— or —32'— of the corresponding gears —7— or —8— according to the direction of movement of said shaft, thereby locking the engaged gear to said shaft to rotate therewith for effecting angular movement of the scroll member —26— to close or open the jaws upon or from the work in a manner hereinafter more fully explained, it being understood that during this axial movement of the shaft —5— the lugs —14— on said shaft will maintain spline engagement with the gear —6— for transmitting motion from the chuck body —23— to the shaft.

As previously intimated, the gear ratios of the companion gears between the shaft —5— and scroll member —26— are different from each other and from that of the companion gears between the lathe spindle —2— and shaft —5— for effecting a differential speed of angular movement of the scroll member while the speed of rotation of the shaft —5— may be constant.

That is, the pitch diameter of the gear —24— is less than that of the gear —22— and, it therefore follows that when the shaft —5— is shifted axially to bring its clutch members —15— into engagement with the recesses —32'— in the gear —7—, the scroll member —26— will be moved angularly about its axis at a greater speed than that of the gear —22—, thereby moving the jaws —27— radially in one direction.

On the other hand, the pitch diameter of the gear —25— of the scroll member —26— is greater than that of the gear —22— and it, therefore, follows that if the shaft —5— is shifted axially to bring its clutch members —15— into engagement with the recesses —32— of the gear —8—, the scroll member —26— will be moved angularly about its axis at a slower rate of speed than that of the gear —22— for moving the jaws —27— radially in an opposite direction.

This axial shifting movement of the shaft —5— to engage its clutch members —15— with one or the other of the gears —7— or —8— is controlled entirely by the operator through the engagement of the lug —19— of the arm —16— with one or the other of the shoulders —31— or —34— of the rack bar —20— which in turn is shifted axially by means of the pinion —21'— and its operating member —21"— which may be held in its clutch-engaging position until the jaws —27— close upon the work or during the opening operation of the jaws.

Although the mechanism described for closing and opening the jaws —27— may be controlled at will, it is desirable to provide means for automatically releasing the clutch immediately upon the gripping operation of the jaws upon the work or rather to stop the closing movement of the jaws as soon as they have tightly gripped the work, and for this purpose the gear case or housing —4— is pivotally suspended from and upon the pin —3— and is provided with a pair of similar cylinders —10— and —10'— arranged equal distances from and at opposite sides of the axis of the pivotal pin —3— and provided with vertical pockets in which are slidably mounted a corresponding number of hollow plungers —12— containing compression springs —9— and —9'— for yieldingly holding the upper ends of the plungers against the top walls of their respective cylinders.

The lower ends of the cylinders are closed by spring-tension adjusting plugs —11— and —11'— against which the lower ends of the springs rest. The upper ends of the plungers —12— are provided with upwardly projecting extensions —a— and —a'— normally engaged with the lower ends of overlying posts or abutments —13— and —13'— which, in turn, are secured to and form a part of the overhanging extension —1"— of the main frame —1— as shown more clearly in Figure 2.

The springs —9— and —9'— are of equal tension and tend to normally hold the gear case —4— in a neutral intermediate position due to the engagement of the extension —a— and —a'— with the corresponding posts —13— and —13'—, the latter being located equal distances from and at opposite sides of the pivotal pin —3— as shown in Figure 2.

As previously explained, when the shaft —5— is in its neutral position and is being rotated by the gears —22— and —6— the clutch members —15— will be free to rotate with the shaft in the intervening space between the hubs of the gears —7— and —8— which in turn will be free to rotate upon and relatively to the shaft —5— but as soon as this shaft is moved axially to bring its clutch members —15— into engagement with one or the other of the gears —7— or —8—, the scroll member —26— will be moved angularly about its axis at a different speed than that of the gear —22— for effecting the radial movement of the jaws —27—.

Now, as soon as the radial movement of the jaws either to their closed positions upon the work or to the limit of their open positions, the resistance due to such limitations will cause a lateral swinging movement of the gear case —4— and arm —16— about the axis of the supporting pin —3— against the action of one of the springs —9— or —9'— due to the transmission of such resistance to the scroll member —26— and one or the other of the gears —7— or —8— which is engaged therewith.

This lateral swinging movement of the gear case —4— and arm —16— together with the shaft —5— and gears mounted thereon, although limited, will be sufficient to disengage the lug —19— on the lower end of the arm —16— from between the shoulders —31— and —34— of the rack bar —20—.

It is, of course, assumed that during this displacement of the lug —19— from between the shoulders —31— and —34— the rack bar and its operating means will still be held in their adjusted positions and immediately upon the displacement of the lug —19— from between the shoulders —31— and —34—, the gear case —4— and arm —16—, together with the shaft —5—, will be automatically restored to their normal positions in the following manner, by the spring under compression.

The opposite end edges of each of the clutch members —15— are tapered or V-shaped while the recesses —32— and —32'— are similarly tapered or complementary to the tapered edges of the clutch members so that immediately upon the lateral swinging movement of the gear case —4— and arm —16— in the manner previously explained and resultant displacement of the lug —19— from between the shoulders —31— and —34— the resistance of the tapered walls of the active recesses —32— or —32'— against the tapered edges of the clutch members —15— will automatically shift the shaft —5— and arm —16— to their normal or neutral positions, thus bringing the lug —19— against the outer face of one of the shoulders as —31— or —34— as shown in Figure 5.

The result of this restoration of the shaft —5— and arm —16— together with the clutch members —15— to their neutral positions, as shown in Figure 1, is to stop the further angular movement of the scroll member —26— which in turn prevents further operation of the jaws —27—.

Under these conditions, the gear case —4— and arm —5— will remain in their abnormal positions against the action of one or the other of the springs —9— or —9'— by reason of the engagement of the lug —19— with one side or the other of the shoulders —31— or —34— or until the operator returns the rack bar —20— and its operating means to their normal positions at which time the opening between the shoulders —31— and —34— will be again registered with the lug —19— to enable the latter to enter between said shoulders as shown in Figures 1, 3 and 4 ready for a repetition of the operation of closing or opening the jaws as previously explained, it being understood that the gear case —4— and arm —5— will be returned to their normal positions by the action of one or the other of the springs —9— or —9'— which may then be under compression.

*Operation*

To illustrate the operation, it may be assumed that the turning of the operating member —21''— and its pinion —21'— counterclockwise will shift the rack bar —20— endwise toward the left hand of Figure 1 to cause the closing of the jaws upon the work.

Under these conditions, the shoulder —31— will engage the lug —19— on the lower end of the arm —16— thereby drawing the shaft —5— endwise in the same direction to engage the clutch members —15— with the gear —8— whereupon a rotary motion will be transmitted from the shaft —5— through said gear to the scroll member —26— for moving the latter angularly to close the jaws upon the work.

Then, as soon as the work is properly gripped by the jaws, the resistance to further closing movement will be transmitted through the scroll member —26— to the active gear —8— thereby opposing further rotation of said gear and causing the gear frame —4— and arm —16— to swing laterally about the axis of the pivotal pin —3— for disengaging the lug —19— on the shoulder —31—.

Immediately following this operation, the tapered sides of the recesses —32— acting upon the corresponding tapered edges of the clutch members —15— will automatically expel said clutch members from their recesses, thereby moving the shaft —5— endwise and causing the lug —19— to assume the position shown in Figure 5.

The operator will then know that the gripping operation is completed and will immediately restore the rack bar —20— to its normal position as shown in Figures 1, 3 and 4, to bring the space between its shoulders —31— and —34— into alinement with the lug —19— whereupon the spring —9— or —9'—, which may be under tension, will restore to frame —4— and arm —16— together with the shaft —5— to their normal positions with the lug —19— between the shoulder —31— and —34—.

On the other hand, in order to open the jaws the direction of movement of the operating member —21''— and rack bar —20— would be reversed, thus bringing the shoulder —34— into engagement with the lug —19— for moving the arm —16— and shaft —5— axially or toward the right hand of Figure 1.

This operation will bring the clutch members —15— into engagement with the recesses —32'— of the gear —7— for transmitting motion from the shaft —5— to the scroll member —26— for releasing the jaws from the work at which time the member —21''— may be returned by hand to its neutral position for releasing the clutch members —15— from engagement with the gear —7— and allowing the latter to idle on the shaft —5—.

Should any means be provided for limiting the opening movement of the jaws and the operation should fail to release the clutch members —15— from the gear —7— before the jaws reach such limit, then when the jaws reach the limit of their opening movement, the resistance produced thereby will stop the further angular movement of the scroll member —26— and gear —7—, thus allowing the gear —24— on the scroll member —26— to rock the gear frame —4— and arm —16— laterally against the action of the spring —9— to displace the lug —19— from between the shoulders —31— and —34— to the same side of the said shoulders as shown in Figure 5 at which time the cam faces of the recesses —32'— engaging the corresponding tapered edges of the clutch members —15— will expel said clutch members from the recesses thereby moving the shaft —5— and arm —16— toward the left hand of Figure 1 and causing the lug —19— to ride against said side of the shoulder —34—, thus stopping the further operation of the scroll member —26— and jaws —27—.

The handle —21''— and bar —20— may be returned to their starting positions to bring the space between the shoulders —31— and —34— into alinement with the lug —19— whereupon the spring —9— then under compression will restore the gear case —4— and arm —16— to their normal positions with the lug —19— between said shoulders ready for a repetition of the operation described.

It is now clear that the same chuck may be used for gripping the inner walls of hollow work by outward movement of the jaws and releasing the work by inward movement of said jaws by moving the handle —21''— toward the left hand end of Figure 1 to grip the work and toward the right hand end to release the work.

It is also clear that the same chuck may be used for gripping the outside or inside of the work when the chuck is rotating in a direction opposite to that shown in Figures 1 and 2, in which case the spring —9'— will be operative and the spring —9— will be inoperative.

The mechanism shown and described is particularly simple, compact and efficient, and while the operation of closing or opening the jaws is entirely under the control of the operator through the medium of a single operating member as —21"—, the operation of releasing the jaws at the time of gripping the work or at the limit of their outward movement is entirely automatic.

It is evident, however, that various changes may be made in the detail construction and operation of various parts of the device without departing from the spirit of the invention.

For example, if the chuck is to be driven in one direction only as indicated by the arrow Figure 2, the spring —9'— might be omitted and its plunger —12— held by any suitable means in fixed relation to the frame —4—.

On the other hand, if the chuck is to be rotated in reverse directions, it might be necessary or desirable to vary the tension of the springs —9— and —9'— which could be easily accomplished by simply adjusting one or the other or both of the screw plugs —11— or —11'—.

What I claim is:

1. In a lathe chuck, a rotary driving element having jaws movable toward and from its axis, means movable angularly about said axis for moving said jaws, means including a clutch for transmitting motion from the driving element to the angularly movable means at a different rate of speed from that of the driving element, means operable at will for engaging and disengaging the clutch, and means brought into action by the closing of the jaws upon the work for automatically disengaging the clutch to stop the further angular movement of said means.

2. In a lathe chuck, a rotary driving element having jaws movable toward and from its axis, means movable angularly about said axis for moving said jaws, means including a clutch for transmitting motion from the driving element to the angularly movable means at a different rate of speed from that of the driving element, means operable at will for engaging and disengaging the clutch, and means brought into action by resistance to the closing or opening movements of the jaws for automatically disengaging the clutch.

3. In a lathe chuck, a rotary driving element having jaws movable toward and from its axis, a scroll member movable angularly about said axis relatively to the driving member for moving the jaws, means including a rotary clutch for transmitting motion from the driving element to said scroll member, means operable at will for engaging the clutch, and means brought into action by the engagement of the jaws with the work for automatically disengaging the clutch.

4. In a power operated lathe chuck, companion driving and driven gears, jaws mounted on one of the gears for movement toward and from the axis thereof, additional companion gears co-axial respectively with the driving and driven gears, a rotary clutch member movable into and out of engagement with one of the second named gears, means for transmitting rotary motion from the driven gear to the clutch member, means actuated by the other of the second named gears for operating the jaws, and means operable at will for shifting said clutch member.

5. A power driven lathe chuck as in claim 4 in which the gear ratios of the companion gears are different.

6. A power operated lathe chuck, a rotary driving element having jaws thereon movable toward and from its axis, a scroll member co-axial with said driving element and movable angularly about said axis for operating the jaws, a driven element actuated by the driving element, a rotary clutch element actuated by the driven element, an additional rotary element co-axial with the driven element and operatively connected to the scroll member for operating the same, and means operable at will for moving the clutch element into and out of engagement with the additional rotary element for controlling the operation of the scroll member.

7. In a power operated lathe chuck, rotary driving and driven gears, jaws on the driving gear movable toward and from the axis thereof, a scroll member co-axial with the driving gear and movable angularly about said axis relatively to said driving gear and provided with gears having their pitch diameters different from each other and from that of the driving and driven gears, a pair of relatively rotatable gears co-axial with the driven gear and meshing respectively with the gears of the scroll member, a rotary clutch element movable alternately into and out of engagement with the relatively rotatable gears, means for transmitting motion from the driven gear to the clutch element, and means operable at will for shifting the clutch element into and out of engagement with each of the corresponding gears.

8. A power operated lathe chuck as in claim 7 in which means is brought into action by resistance to the movement of the jaws for breaking the connection between the clutch element and its shifting means, said clutch element and gears engaged thereby having means for automatically disengaging the clutch element from the gear engaged thereby when the connection between the clutch element and its shifting means is broken.

9. The combination with a support, a chuck body rotatably mounted on the support and provided with radial jaw guides, and a scroll member mounted on the chuck body to rotate therewith and having an independent angular movement about the axis of the spindle for closing and opening the jaws upon and from the work, of means including a clutch for transmitting angular motion from the chuck body to the scroll member, and means operable at will for shifting the clutch to and from its driving position.

10. In a lathe chuck, a support, a chuck body rotatably mounted on said support and provided with jaw guides, jaws movable on said guides, a scroll member for operating said jaws, a rotary and axially movable clutch member, means actuated by the chuck body for rotating the clutch member, a rotary member arranged to operate the scroll member at a different speed than that of the chuck body, and means operable at will for moving the clutch member into and out of driving engagement with said rotary member.

11. In a power operated lathe chuck, companion driving and driven gears, jaws mounted on the driving gear and movable toward and from the axis thereof for gripping and releasing the work, a scroll member movable about said axis for operating the jaws, means including an axially movable clutch member for transmitting rotary motion from the driven gear to said scroll member at a rate of speed different from that of the driving gear, and means operable at will for shifting the clutch member axially to and from its driving position.

12. In a power operated lathe chuck, companion driving and driven gears, jaws mounted on the driving gear and movable toward and from the axis thereof for gripping and releasing the work, a scroll member movable about said axis for operating the jaws, and provided with gears of different pitch, a rotary member driven by one of the first named gears, additional gears loosely mounted on said member, a clutch splined on said rotary member, and means for moving said clutch into and out of engagement with each of said additional gears for operating the scroll.

13. In a power operated chuck, a frame, a rotary driving element mounted on the frame and having jaws movable toward and from its axis, a jaw-operating member movable about said axis, means including a clutch member for transmitting motion from the driving element to the jaw-operating member, means including normally engaged members operable at will for shifting the clutch member to its driving position, means brought into action by stoppage of movement of the jaws for automatically disengaging said normally engaged members, and spring actuated means for automatically returning the clutch member to its neutral position when the normally engaged members are disengaged.

14. In a power-operated chuck, a frame, a rotary driving element mounted on the frame and provided with jaws movable toward and from its axis, means including a clutch member actuated by said driving element for operating said jaws, means including normally engaged members operable at will for shifting the clutch member to its driving position, means brought into action by the tightening of the jaws upon the work for automatically disengaging the normally engaged members, and means for automatically shifting the clutch member from its driving position when said normally engaged members are disengaged.

In witness whereof I have hereunto set my hand this 6th day of November, 1931.

HERMAN CASLER.